United States Patent
Lavoie et al.

(10) Patent No.: US 6,847,297 B2
(45) Date of Patent: Jan. 25, 2005

(54) LOCATOR DEVICES AND METHODS FOR CENTRALLY CONTROLLED POWER DISTRIBUTION SYSTEMS

(75) Inventors: Gregory P. Lavoie, Bristol, CT (US); Thomas F. Papallo, Farmington, CT (US); David G Fletcher, Simsbury, CT (US); Jane Barber, Downingtown, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/662,967

(22) Filed: Sep. 15, 2003

(65) Prior Publication Data

US 2004/0133814 A1 Jul. 8, 2004

Related U.S. Application Data

(60) Provisional application No. 60/438,159, filed on Jan. 6, 2003.

(51) Int. Cl.$^7$ ........................ G08B 21/00; H04M 11/04; G05B 19/18
(52) U.S. Cl. ........................ 340/540; 340/3.1; 340/3.43; 340/3.5; 340/310.01; 340/310.06; 340/650; 700/12; 700/17; 700/22; 702/58; 702/59; 702/62

(58) Field of Search ................... 340/540, 506, 340/3.1, 3.2, 3.43, 3.5, 3.44, 652, 653, 650, 651, 657, 659, 310.01, 310.06–310.08, 310.05; 700/3, 9, 11, 12, 17, 21, 22, 79, 83, 291, 293, 292, 286, 297, 300; 713/300; 702/57–60, 62; 361/93.2, 42, 47, 62, 65; 307/37, 125, 126, 132 E, 132 R (56) References Cited

U.S. PATENT DOCUMENTS

| 5,498,956 A | * | 3/1996 | Kinney et al. | ............... 324/142 |
| 6,496,342 B1 | * | 12/2002 | Horvath et al. | ............... 361/65 |
| 2003/0125886 A1 | * | 7/2003 | Spitaels et al. | ............... 702/62 |

* cited by examiner

Primary Examiner—Donnie L. Crosland
(74) Attorney, Agent, or Firm—Ohlandt, Greeley Ruggiero & Perle (57) ABSTRACT

A data sample and transmission module for a power distribution system having a microprocessor, a locator device, and a network interface is provided. The microprocessor samples one or more first signals indicative of a condition of power in the power distribution system. The locator device is changeable between a first state and a second state. The network interface can place the microprocessor in communication with a network so that the microprocessor samples the first signals based in part upon a synchronization signal receivable from the network and so that the locator device changes from the first state to the second state in response to a command receivable from the data network.

20 Claims, 5 Drawing Sheets

LOCATOR DEVICES AND METHODS FOR CENTRALLY CONTROLLED POWER DISTRIBUTION SYSTEMS

GROSS REFERENCE TO RELATED APPLICATIONS

This application claims benefit of U.S. Provisional Application Ser. No. 60/438,159 filed on Jan. 6, 2003, the content of which is incorporated by reference herein.

BACKGROUND OF INVENTION

The present disclosure relates to centrally controlled power distribution systems. More particularly, the present disclosure relates to locator devices and methods for such centrally controlled power distribution systems.

Power distribution systems commonly divide incoming power into a number of branch circuits. The branch circuits supply power to various equipment (i.e., loads) in the industrial facility. Circuit breakers are typically provided in each branch circuit to facilitate protecting equipment within the branch circuit. Circuit breakers are designed to open and close a circuit by non-automatic means and to open the circuit automatically on a predetermined over-current without damage to itself when properly applied within its rating. The circuit breakers commonly include supplementary protectors enclosed within the body of the circuit breaker. One common type of supplementary protector is known as an electronic trip unit. The circuit breaker and its supplementary protector have proven useful at managing the protection of the loads on the circuit.

It can be desired to integrate the load management of the branch circuits to one another. Further, it can be desired to integrate the management of the loads on the branch circuits with the management of the power feeds feeding the branch circuits. Still further, it can be desired to provide for monitoring of the system. However, the development of such centrally controlled power distribution systems has been hindered by one or more practical attributes of the system.

Accordingly, there is a continuing need for centrally controlled power distribution systems that address one or more of the aforementioned practical attributes.

BRIEF DESCRIPTION OF THE INVENTION

A data sample and transmission module for a power distribution system is provided. The module has a microprocessor, a locator device, and a network interface. The microprocessor samples one or more first signals indicative of a condition of power in the power distribution system. The locator device is changeable between a first state and a second state. The network interface can place the microprocessor in communication with a network so that the microprocessor samples the first signals based in part upon a synchronization signal receivable from the network and so that the locator device changes from the first state to the second state in response to a command receivable from the data network.

A protection system for a power distribution system is also provided. The system includes a human machine interface, a central computer, a first module, a second module, and a network. The central computer is in communication with the human machine interface. The first module is in communication with a first circuit breaker, while the second module is in communication with a second circuit breaker. The first module has a first locator device and the human machine interface has a first representation of the first module. Similarly, the second module has a second locator device and the human machine interface has a second representation of the second module. The network is in communication with the central computer, the first module, and the second module so that the central computer controls the first and second circuit breakers. The first representation is selectable to change the first locator device from a first state to a second state.

A method of corresponding a virtual representation to a particular device among a plurality of devices is provided. The method includes selecting the virtual representation on an interface; sending a first command from the interface to a central processor in response to selecting the virtual representation, the first command being representative of a locator state for the particular device that corresponds to the selected virtual representation; sending a second command from the central processor to the particular device in response to the first command; sending a third command from the plurality of devices to a locator device in response to the second command; and changing the locator state of at least the particular device in response to the third command.

DETAILED DESCRIPTION

Figure 1:
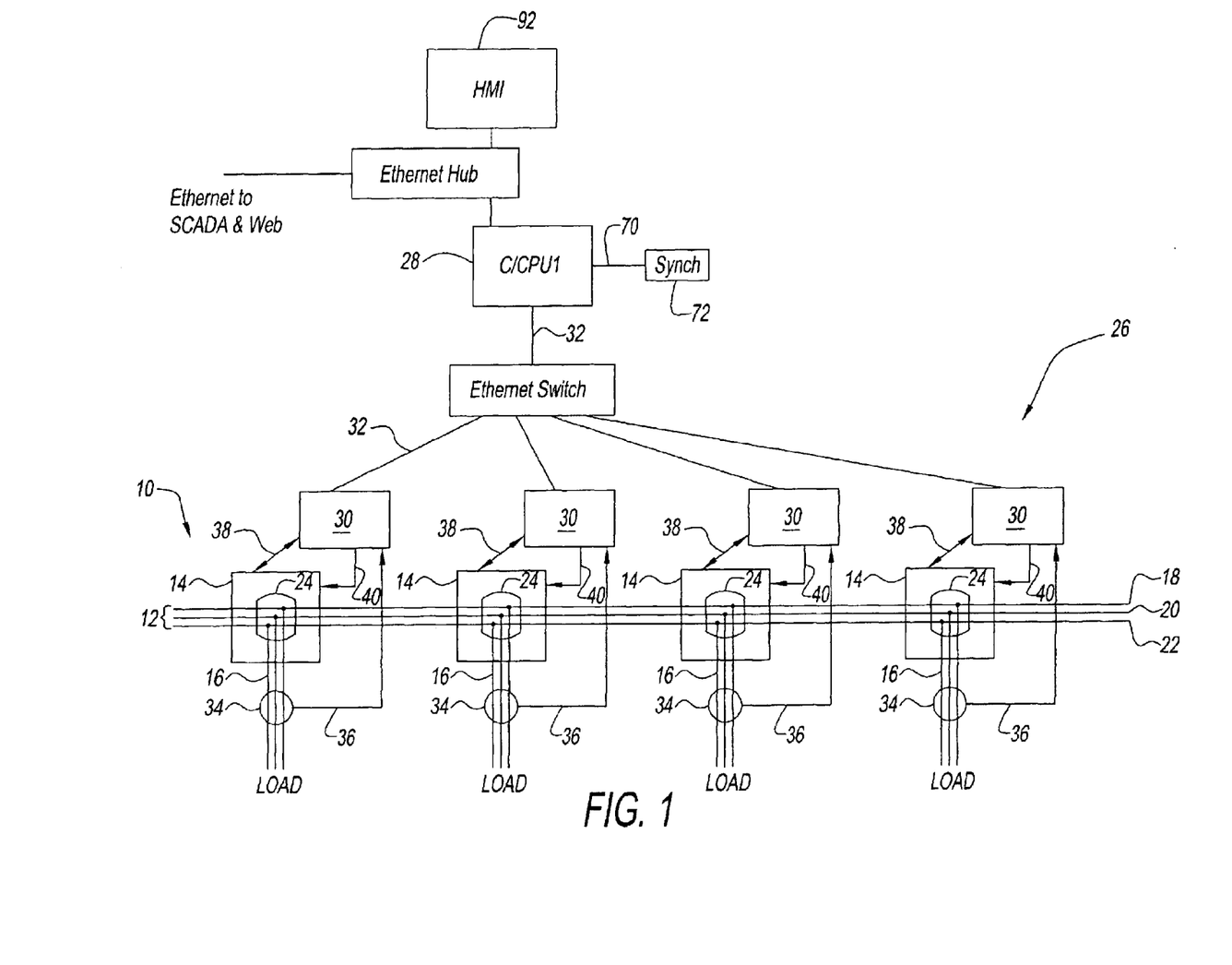
FIG. 1 is a schematic view of an exemplary embodiment of a centrally controlled protection, monitoring, and control system.

Referring now to the drawings and in particular to FIG. 1, an exemplary embodiment of a power distribution system generally referred to by reference numeral 10 is illustrated. System 10 distributes power from at least one power bus 12 through a number or plurality of circuit breakers 14 to branch circuits 16.

Power bus 12 is illustrated by way of example as a three-phase power system having a first phase 18, a second phase 20, and a third phase 22. Power bus 12 can also include a neutral phase (not shown). System 10 is illustrated for purposes of clarity distributing power from power bus 12 to four circuits 16 by four breakers 14. Of course, it is contemplated by the present disclosure for power bus 12 to have any desired number of phases and/or for system 10 to have any desired number of circuit breakers 14.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "system"). System 26 is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, system 26 can include protection and control schemes that consider the value of electrical signals, such as current magnitude and phase, at one or all circuit breakers 14. Further, system 26 integrates the protection, control, and monitoring functions of the individual breakers 14 of power distribution system 10 in a single, centralized control processor (e.g., CCPU 28). System 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs all primary power distribution functions for power distribution system 10. Namely, CCPU 28 performs all instantaneous overcurrent protection (IOC), sort time overcurrent, longtime overcurrent, relay protection, and logic control as well as digital signal processing functions of system 26. Thus, system 26 enables settings to be changed and data to be logged in single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition of the incoming power in circuits 16 and provide a first signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position of separable contacts 24, a spring charge switch status, and others. In addition, module 30 is configured to operate circuit breaker 14 by sending one or more third signals 40 to the breaker to open/close separable contacts 24 as desired. In a first embodiment, circuit breakers 14 cannot open separable contacts 24 unless instructed to do so by system 26.

System 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, system 26 can be configured to provide a consistent fault response time. As used herein, the fault response time of system 26 is defined as the time between when a fault condition occurs and the time module 30 issues an trip command to its associated breaker 14. In an exemplary embodiment, system 26 has a fault response time that is less than a single cycle of the 60 Hz (hertz) waveform. For example, system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for managing collision domains.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at the CCPU. In addition, CCPU 28 can perform one or more monitoring functions on the centrally located system information. Accordingly, system 26 provides a coherent and integrated protection, control, and monitoring methodology not considered by prior systems. For example, system 26 integrates and coordinates load management, feed management, system monitoring, and other system protection functions in a low cost and easy to install system.

Figure 2:
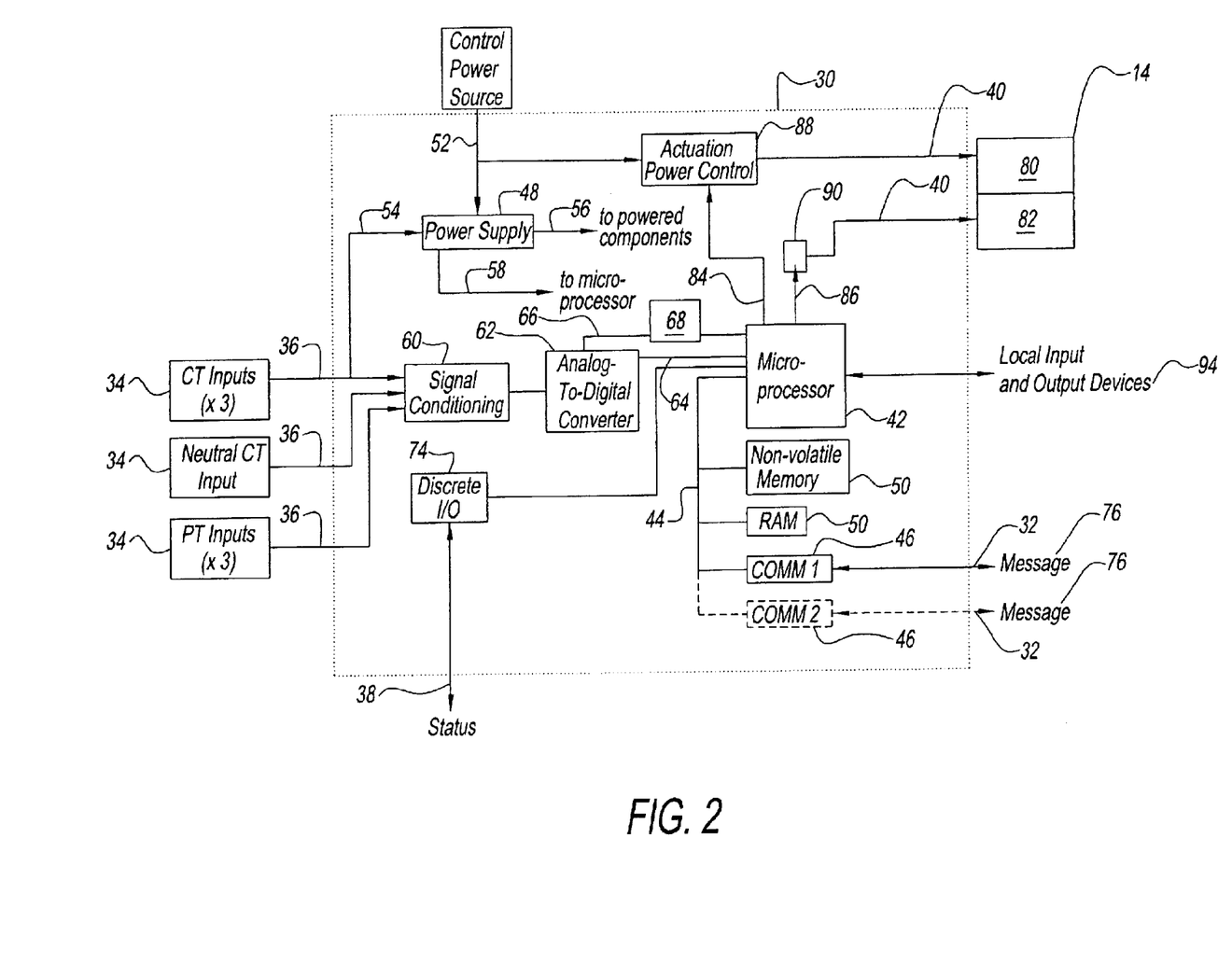
FIG. 2 is a schematic view of an exemplary embodiment of a data sample and transmission module.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can includes a filtering circuit (not shown) to improve a signal-to-noise ratio first signal 36, a gain circuit (not shown) to amplify the first signal, a level adjustment circuit (not shown) to shift the first signal to a predetermined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in system 26 to be collected at substantially the same time. Specifically, it is desired for digital signals 64 from all of the modules 30 in system 26 to be representative of substantially the same time instance of the power in power distribution system 10.

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in system 26 to ensure that the sampling (i.e., digital signals 64) from all of the modules in the system are synchronized.

Accordingly, system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of system 26 can be affected by the port-to-port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32.

In response to second message 78, microprocessor 42 causes third signal 40 to operate (e.g., open contacts 24)

circuit breaker 14. Circuit breaker 14 can include more than one operation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated only when second source 54 is present. In this manner, microprocessor 42 can operate circuit breaker 14 in response to second message 78 regardless of the state of first and second sources 52, 54.

Modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, system 26 can control each circuit breaker 14 based on the information from that breaker alone, or in combination with the information from one or more of the other breakers in the system 26. Under normal operating conditions, system 26 performs all monitoring, protection, and control decisions at CCPU 28.

Since the protection and monitoring algorithms of system 26 are resident in CCPU 28, these algorithms can be enabled without requiring hardware or software changes in circuit breaker 14 or module 30. For example, system 26 can include a data entry device 92, such as a human-machine-interface (HMI), in communication with CCPU 28. In this embodiment, one or more attributes and functions of the protection and monitoring algorithms resident on CCPU 28 can easily be modified from data entry device 92. Thus, circuit breaker 14 and module 30 can be more standardized than was possible with the circuit breakers/trip units of prior systems. For example, over one hundred separate circuit breakers/trip units have been needed to provide a full range of sizes normally required for protection of a power distribution system. However, the generic nature of circuit breaker 14 and module 30 enabled by system 26 can reduce this number by over sixty percent. Thus, system 26 can resolve the inventory issues, retrofittability issues, design delay issues, installation delay issues, and cost issues of prior power distribution systems.

It should be recognized that system 26 is described above as having one CCPU 28 communication with modules 30 by way of a single network 32. However, it is contemplated by the present disclosure for system 26 to have redundant CCPUs 26 and networks 32 as illustrated in phantom in FIG. 1. For example, module 30 is illustrated in FIG. 2 having two network interfaces 46. Each interface 46 is configured to operatively connect module 30 to a separate CCPU 28 via a separate data network 32. In this manner, system 26 would remain operative even in case of a failure in one of the redundant systems.

Modules 30 can further include one or more backup systems for controlling breakers 14 independent of CCPU 28. For example, system 26 may be unable to protect circuit 16 in case of a power outage in first source 52, during the initial startup of CCPU 28, in case of a failure of network 32, and other reasons. Under these failure conditions, each module 30 includes one or more backup systems to ensure that at least some protection is provided to circuit breaker 14. The backup system can include one or more of an analog circuit driven by second source 54, a separate microprocessor driven by second source 54, and others.

Advantageously, data entry device 92 (e.g., HMI) provides the ability to control and monitor breakers 14 from the HMI, which can often be remote from the breakers. HMI 92 can be, for example, a touch screen device having a virtual representation (not shown) of breaker 14 displayed thereon. It has been determined that the virtual representation of breakers 14 in HMI 92 can hamper the practical utility of the system. Specifically, it has been found that it is necessary for the user to be sure that the virtual device being controlled on HMI 92 corresponds to the physical device (e.g, breaker 14) intended to be controlled. Since system 26 communicates via network 32, a user can not simply follow the wires between HMI 92 and breaker 14 as would have been done in prior art systems.

Accordingly, it has been found that inclusion in module 30 of a local output device can provide the user with the ability to determine which physical device the virtual representation in HMI 92 corresponds. Here, HMI 92 can include a module control screen that allows a user to activate the output device on any module 30. In system 26, each module 30 is in close proximity (e.g., above, below, next to, etc.) to its breaker 14. Thus, users can clearly tell the corresponding relationship between modules 30 breakers 14. In this manner, the user can easily associate the virtual device on HMI 92 to the correct physical device (e.g., breaker 14) by the close proximity of module 30 having its local output device activated.

Figure 3:
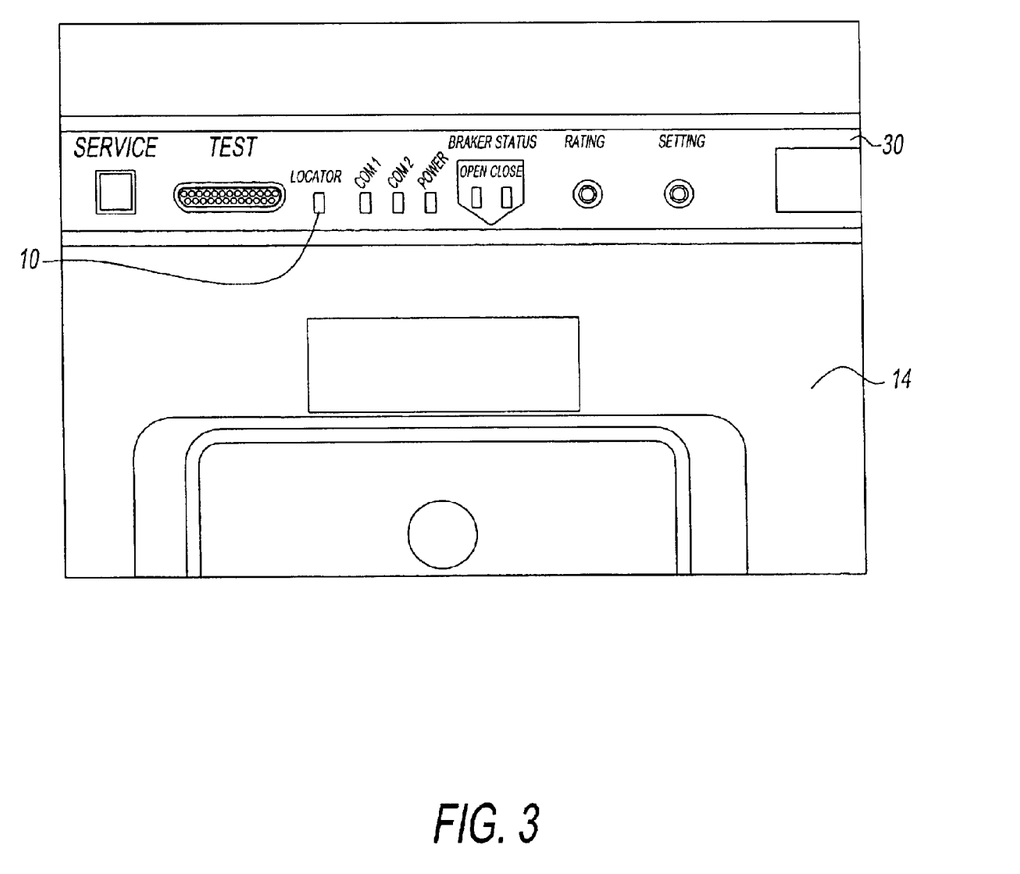
FIG. 3 is a front view of the module of FIG. 2.

Referring now to FIGS. 2 and 3, module 30 can communicate with one or more locator devices 94 local to or resident on the module. For example, locator device 94 can be an indicator, such as a visual or audible indicator. In one embodiment illustrated in FIG. 3, device 94 is a light emitting diode (LED) configured to communicate a status of module 30. Here, the locator device 94 can have a first state or a second state. In the first state, locator device 94 can be "off", while the locator device can be "on" or "blinking" in the second state. In one embodiment, system 26 is configured to eliminate confusion by ensuring that only one locator device 94 on all of the modules 30 in the system is in the second state at any given time.

It should be recognized that locator device 94 is illustrated by way of example being included in module 30. Of course, it is contemplated by the present disclosure for locator device 94 to be disposed in breaker 14 or in both the breaker and module.

Figure 4:
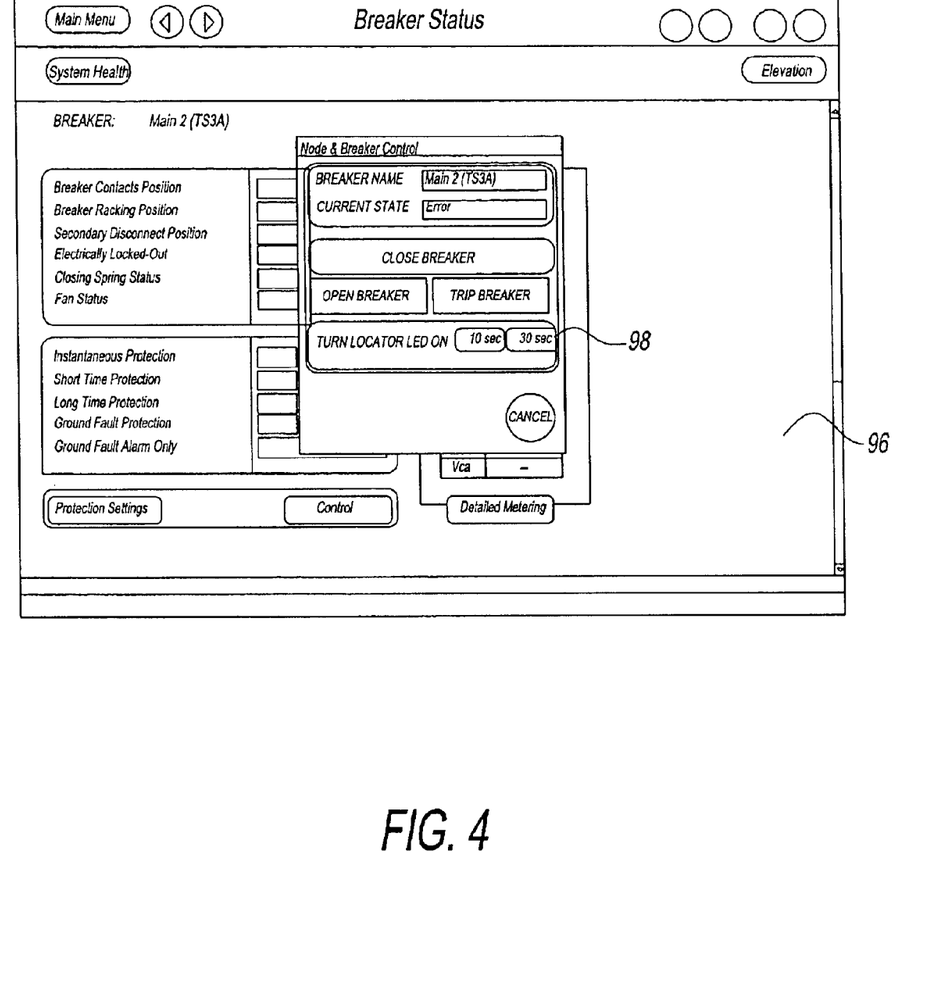
FIG. 4 is a schematic view of an exemplary embodiment of a module control screen.

HMI 92 can include a module control screen 96 having a module control button 98 defined thereon as seen in FIG. 4. In the illustrated embodiment, button 98 allows the user to turn on locator device 94, which allows the user to associate the virtual device to the physical device. For example, button 98 can allow the user to turn on locator device 94 for a selected period of time, such as, but not limited to ten seconds or thirty seconds. Of course, it is contemplated for button 98 to turn locator device 94 on until it is turned off by the button.

Figure 5:
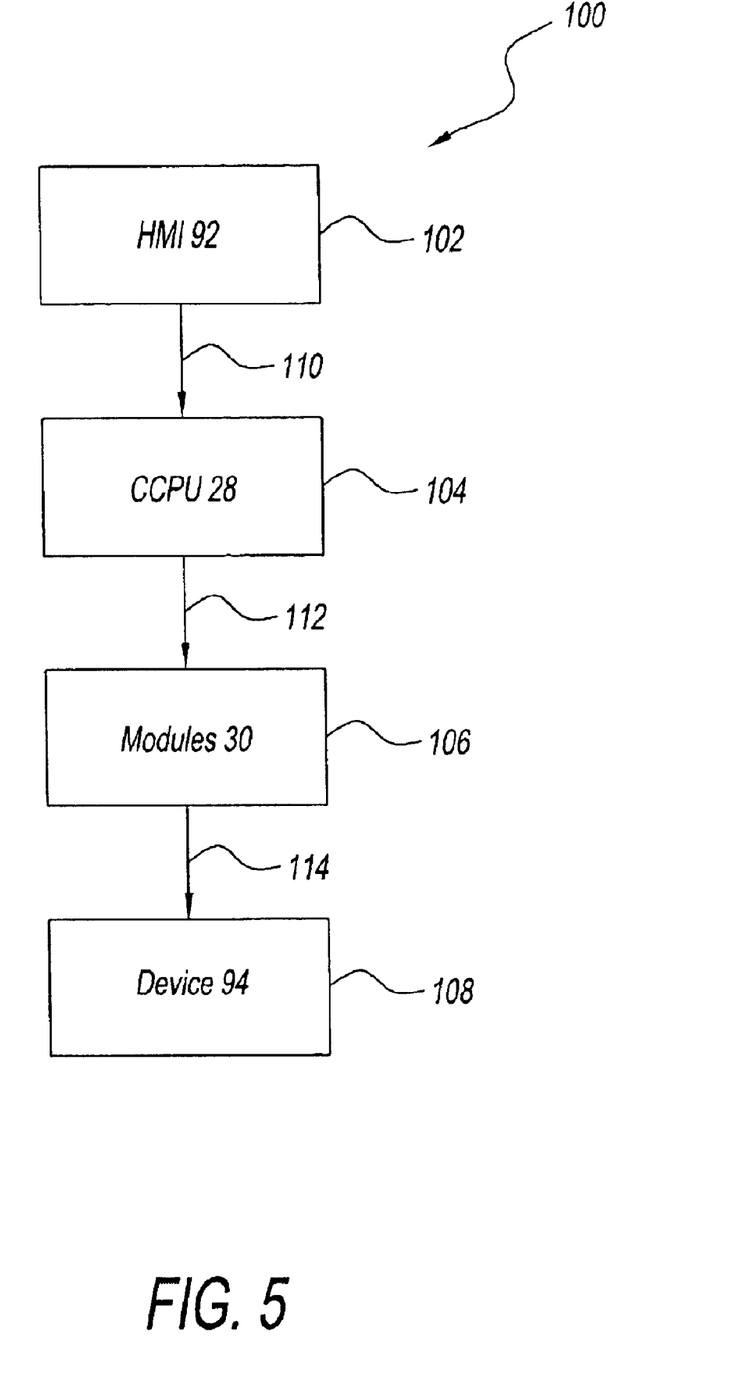
FIG. 5 illustrates an exemplary embodiment of a method for locating devices in centrally controlled power distribution systems.

Referring now to FIG. 5, an exemplary embodiment of a method for operating the locator device is illustrated generally by reference numeral 100. Method 100 includes a first step 102, a second step 104, a third step 106, and a fourth step 108. Method 100 allows a user to know for certain what physical device (e.g., breaker 14) is being shown on HMI 92.

In first step 102, a user (not shown) operates button 98 via HMI 92 to change the state of locator device 94 for the virtual device they are interested in. As a result of operating button 98 of the desired virtual device, HMI 92 sends a first command 110 to CCPU 28 to change the state of the locator device 94 for the physical device that corresponds to the selected virtual device. For example, first command 110 can instruct CCPU 28 to change the state of locator device 94 from the first state (e.g., off) to the second state (e.g., on) or from the second state back to the first state.

In second step 104, CCPU 28 accepts first command 110 from HMI 92 and sends a second command 112 to all of the modules 30 in system 26. Second command 112, which is generated by CCPU 28 in response to first command 110, is configured to modify the state of locator device 94 for the breaker specified at HMI 92 to the second state (e.g., on). In addition, second command 112 can, in some embodiments, be configured to modify the state of locator devices 94 for all other breakers in system 26 to the first state (e.g., off). In this manner, only one locator device 94 is in the second state (e.g., on) at any given time.

Modules 30 each accept second command 112 from CCPU 28 in third step 106 and send a third command 114 to locator device 94 to set the device to either the first or the second state. In some embodiments, locator devices 94 remain in the state set by third command 114 until instructed otherwise by deactivation of button 98 on HMI 92. In other embodiments, locator devices 94 can remain in the state set by third command 114 for a selected time, such as thirty seconds, before returning to the first state.

Accordingly, system 26 having modules 30 with local locator device 94 easily allows the user to avoid confusion as to what module 30 is being controlled by the virtual device displayed by HMI 92. In this manner, system 26 allows the user of system 26 via HMI 92 to associate the physical device (e.g., breaker 14) to the virtual device displayed by the HMI via activation/deactivation of locator device 94 on modules 30.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

What is claimed is:

1. A data sample and transmission module for a power distribution system, comprising:
    a microprocessor for sampling one or more first signals indicative of a condition of power in the power distribution system;
    a locator device changeable between a first state and a second state; and
    a network interface for placing said microprocessor in communication with a network so that said microprocessor samples said one or more first signals based in part upon a synchronization signal receivable from said network and so that said locator device changes from said first state to said second state in response to a command receivable from said network.

2. The module as in claim 1, wherein said microprocessor is configured to package said one or more first signals in a first message and to send said first message over said data network.

3. The module as in claim 2, wherein said microprocessor operates a circuit breaker in the power distribution system in response to a second message receivable from the data network.

4. The module as in claim 3, wherein said locator device is a visual device or an audible device.

5. The module as in claim 3, wherein said locator device is a light emitting diode.

6. The module as in claim 5, wherein said locator device is off in said first state and on in said second state.

7. The module as in claim 1, wherein said command associates the module with a virtual device.

8. The module as in claim 1, wherein said microprocessor is configured to receive one or more second signals indicative of a condition of a circuit breaker in the power distribution system.

9. The module as in claim 1, further comprising a power supply providing power to said microprocessor, said power supply receiving said power from a first source, a second source, or a combination thereof.

10. The module as in claim 9, wherein said power supply provides a third signal to said microprocessor, said third signal being indicative of whether said power supply is receiving said power from said first source, said second source, or said combination.

11. A protection system for a power distribution system, comprising
    a human machine interface;
    a central computer in communication with said human machine interface;
    a first module in communication with a first circuit breaker, said first module having a first locator device defined thereon, said human machine interface having a first representation of said first module;
    a second module in communication with a second circuit breaker, said second module having a second locator device defined thereon, said human machine interface having a second representation of said second module; and
    a network in communication with said central computer, said first module, and said second module so that said central computer controls said first and second circuit breakers, said first representation being selectable to change said first locator device from a first state to a second state.

12. The system as in claim 11, wherein said first representation is selectable to ensure said second locator device is in said first state.

13. The system as in claim 12, wherein said second representation is selectable to place said first locator device in said first state and said second locator device in said second state.

14. The system as in claim 13, wherein only one of said first and second locator devices can be in said second state at any given time.

15. The system as in claim 11, wherein the protection system has a consistent fault response time.

16. The system as in claim 15, wherein said consistent fault response time is less than a single cycle of power in the power distribution system.

17. A method of corresponding a virtual representation to a particular device among a plurality of devices, comprising:

selecting the virtual representation on an interface;

sending a first command from said interface to a central processor in response to selecting the virtual representation, said first command being representative of a locator state for the particular device that corresponds to the selected virtual representation;

sending a second command from said central processor to the particular device in response to said first command;

sending a third command from the plurality of devices to a locator device in response to said second command; and changing said locator state of at least the particular device in response to said third command.

18. The method as in claim 17, wherein said second command is representative of said locator state for the particular device and the plurality of devices.

19. The method as in claim 18, further comprising changing said locator state of the particular device and the plurality of devices in response to said second command.

20. The method as in claim 18, wherein said second command changes said locator state for the particular device to a second state and said locator state for the plurality of devices to a first state.

* * * * *